United States Patent
Spexarth et al.

(10) Patent No.: US 9,925,697 B2
(45) Date of Patent: Mar. 27, 2018

(54) METHOD FOR BLADDER REPAIR DURING COMPOSITE PART CURING

(71) Applicant: Spirit AeroSystems, Inc., Wichita, KS (US)

(72) Inventors: Gerard F. Spexarth, Wichita, KS (US); Darin Clay Wiley, Wellington, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 590 days.

(21) Appl. No.: 14/581,393

(22) Filed: Dec. 23, 2014

(65) Prior Publication Data

US 2016/0176073 A1 Jun. 23, 2016

(51) Int. Cl.
  *B29C 70/44* (2006.01)
  *B29C 37/00* (2006.01)
  *B29C 35/02* (2006.01)
  *B29L 31/00* (2006.01)

(52) U.S. Cl.
  CPC .......... *B29C 37/0096* (2013.01); *B29C 35/02* (2013.01); *B29C 70/44* (2013.01); *B29C 37/0075* (2013.01); *B29K 2845/00* (2013.01); *B29L 2031/757* (2013.01)

(58) Field of Classification Search
  CPC .......................... B29C 70/44; B29C 37/0096
  See application file for complete search history.

(56) References Cited

U.S. PATENT DOCUMENTS

| | | | | |
|---|---|---|---|---|
| 5,454,895 A | * | 10/1995 | Imparato | B29C 70/342 156/156 |
| 8,460,502 B2 | | 6/2013 | Bergmann et al. | |
| 2010/0116938 A1 | * | 5/2010 | Kline | B29C 65/5042 244/131 |
| 2010/0186899 A1 | * | 7/2010 | Jackson | B29C 33/10 156/382 |
| 2013/0161850 A1 | * | 6/2013 | Harris | B29C 37/0096 264/40.1 |

\* cited by examiner

*Primary Examiner* — Matthew Daniels
*Assistant Examiner* — Patrick Butler
(74) *Attorney, Agent, or Firm* — Hovey Williams LLP

(57) ABSTRACT

A system and method of a method of sealing a leak in an internal bladder within a hollow uncured composite part during cure thereof. The method may include placing a rescue bladder within the internal bladder and sealing an impermeable membrane and/or rigid forming tool to the rescue bladder, such that the uncured composite part is sealed within a chamber cooperatively formed by the impermeable membrane, the rigid forming tool, and the outer surface of the rescue bladder. A vent opening of the rescue bladder and/or a vent opening of the end fitting may remain located outward of the chamber. The method may also include curing the hollow uncured composite part, introducing a pressure differential causing the rescue bladder to inflate and press the internal bladder against an inner surface of the hollow uncured composite part.

20 Claims, 4 Drawing Sheets

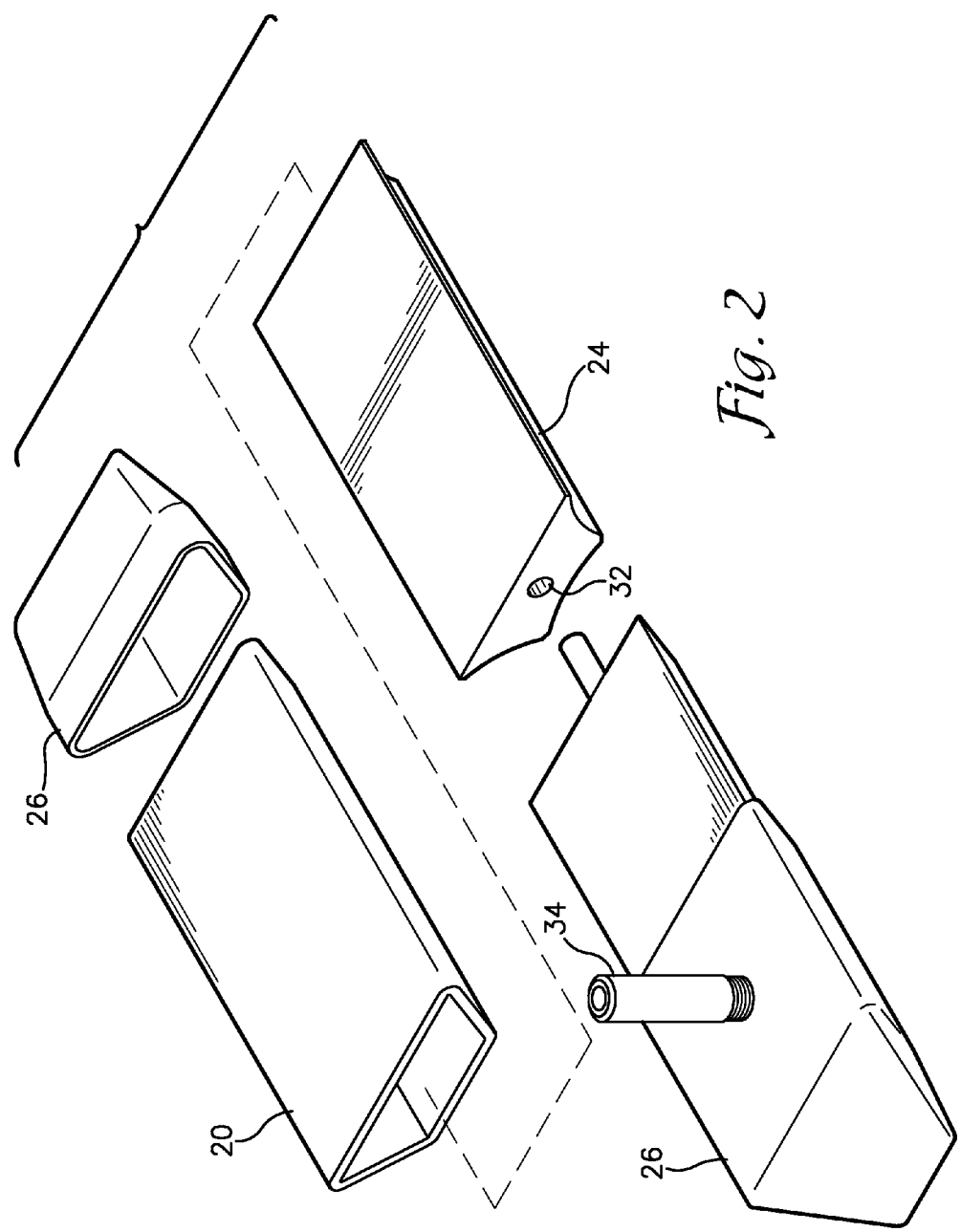

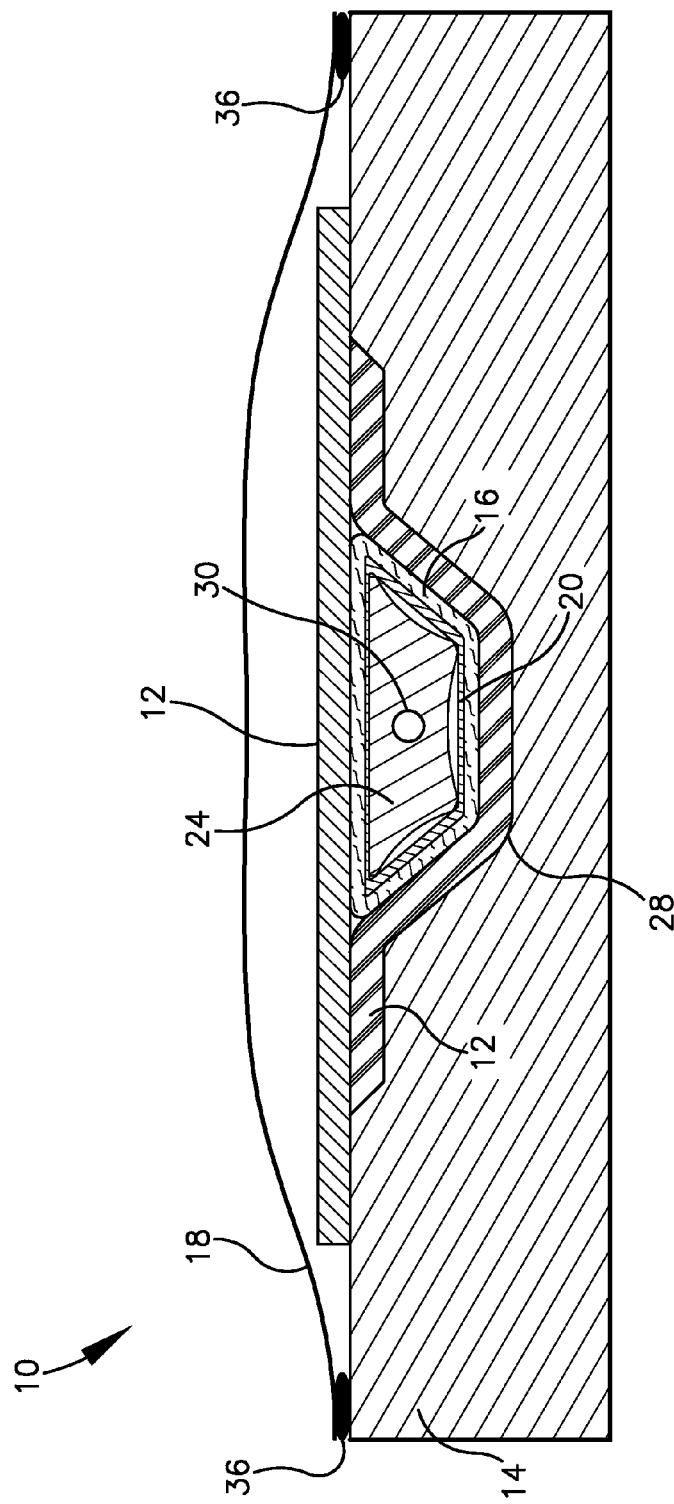

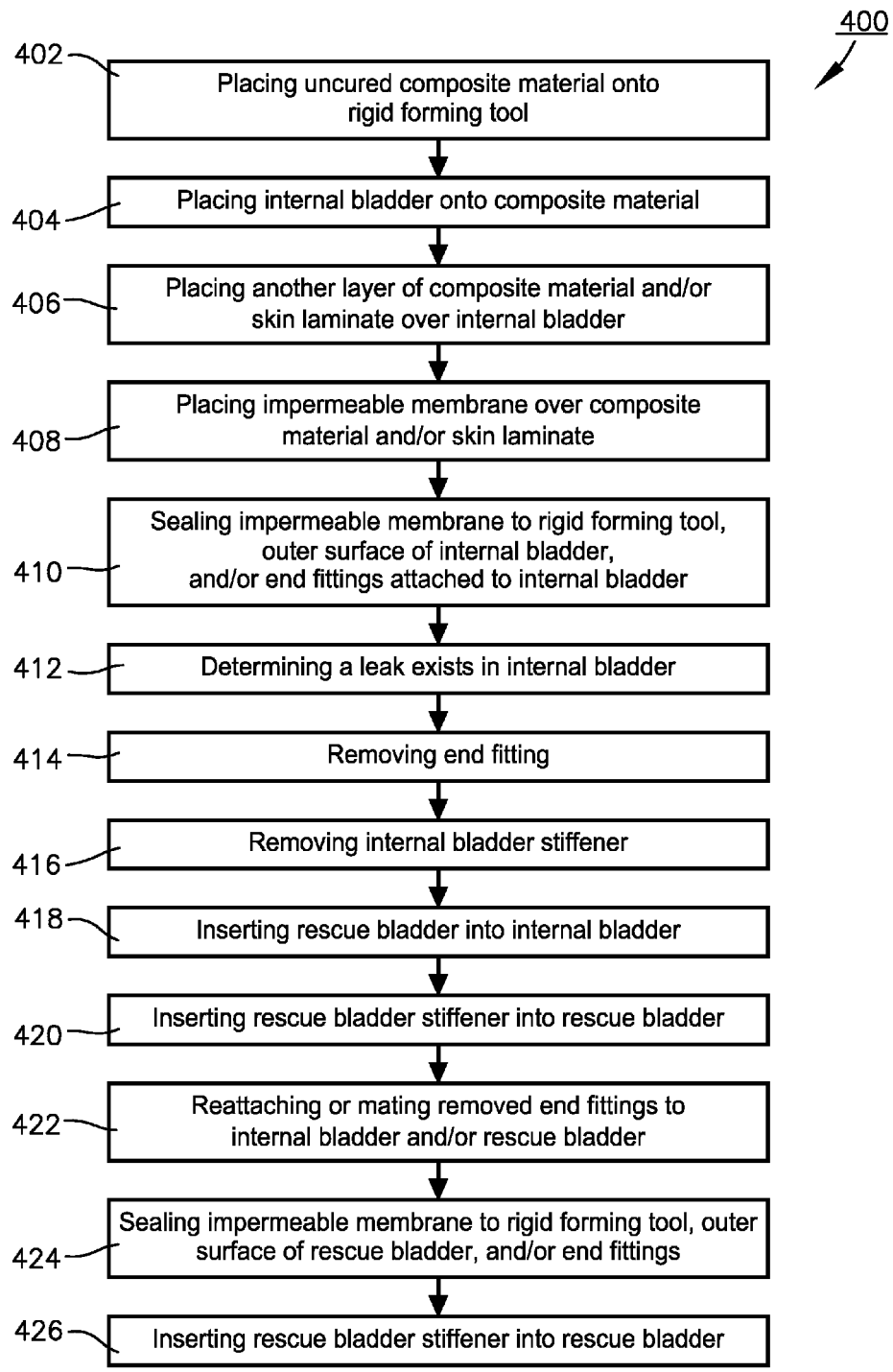

METHOD FOR BLADDER REPAIR DURING COMPOSITE PART CURING

BACKGROUND

Parts made of composite materials are used in a variety of industries, including the aircraft industry. Some hollow composite parts, such as aircraft stringers of a fuselage, are internally supported by a bladder during cure, while externally supported by rigid tool and/or externally compressed via a sealed vacuum bag or other such flexible, impermeable membrane. The bladder typically expands during curing of the composite material into the composite part, and may be susceptible to developing leaks under the high pressure and heat of autoclave curing.

Sometimes leaks are not detected until after the cure cycle has begun. This may occur when smaller undetectable leaks develop into larger detrimental leaks during the added pressure and heat of autoclave cure cycles. Human error may also introduce leaks to the bladders during a stage of the composite manufacturing process in which the bladders cannot be removed or repaired.

During the composite manufacturing process, the composite material may reach a critical cure stage at approximately 190° F.-200° F. If a leak in the vacuum bag or the bladder is discovered prior to this critical stage, the cure cycle can be aborted and the leak can be fixed. For example, an operator can open the door to the autoclave and search for a vacuum bag leak using an ultrasonic microphone. Once the vacuum bag leak is found, it can be repaired. However, since most of the bladder is covered in layers of composite material at this stage, a leak deep within the bladder may be hidden, undetectable, and/or difficult or impossible to fix.

SUMMARY OF THE INVENTION

Embodiments of the present invention solve the above-mentioned problems and provide a distinct advance in the art of composite part manufacture. One embodiment of the invention provides a method of sealing a leak in an internal bladder within a hollow uncured composite part during cure thereof. The method may include the steps of placing a rescue bladder within the internal bladder, sealing an impermeable membrane and/or rigid forming tool to the rescue bladder, and curing the hollow uncured composite part under heat and pressure. The rescue bladder may be hollow with at least one vent opening, an outer surface, and an inner surface. The outer surface of the rescue bladder or an end fitting fluidly coupled with the vent opening of the rescue bladder may be sealed to the impermeable membrane and/or the rigid forming tool. This may seal the uncured composite part within a chamber cooperatively formed by the impermeable membrane, the rigid forming tool, and the outer surface of the rescue bladder, with the vent opening of the rescue bladder and/or a vent opening of the end fitting located outward of the chamber. A pressure differential between atmosphere within the chamber and atmosphere outward of the chamber during the curing step may cause the rescue bladder to inflate and press the internal bladder against an inner surface of the hollow uncured composite part.

Another embodiment of the invention provides a method of sealing a leak in an internal bladder similar to the method described above, and additionally including a step of removing an internal bladder stiffener from within the internal bladder to make room for the rescue bladder to be placed within the internal bladder. Furthermore, in this embodiment of the invention, a rescue bladder stiffener may located within the rescue bladder to provide additional support to the internal bladder.

Yet another embodiment of the invention provides a method of sealing a leak in an internal bladder similar to the method described above, but additionally including the steps of determining a leak exists in the internal bladder prior to cure temperatures reaching a critical cure stage temperature and stopping curing of the uncured composite part prior to temperatures reaching the critical cure stage temperature and prior to placing the rescue bladder within the internal bladder. Furthermore, the hollow uncured composite part may be an aircraft stringer and may include composite material wrapped around the internal bladder and placed in a stringer cavity of the rigid forming tool.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein:

FIG. 2 is an exploded perspective view of a rescue bladder, rescue bladder stiffener, and end fittings of the composite manufacturing system of FIG. 1;

FIG. 3 is a schematic vertical cross-sectional elevation view of the composite manufacturing system of FIG. 1 with the rescue bladder of FIG. 2 inserted into an internal bladder thereof; and FIG. 4 is a flow diagram of steps of a method for sealing a leak discovered in the internal bladder during composite part cure in accordance with various embodiments of the present invention.

Figure 1:
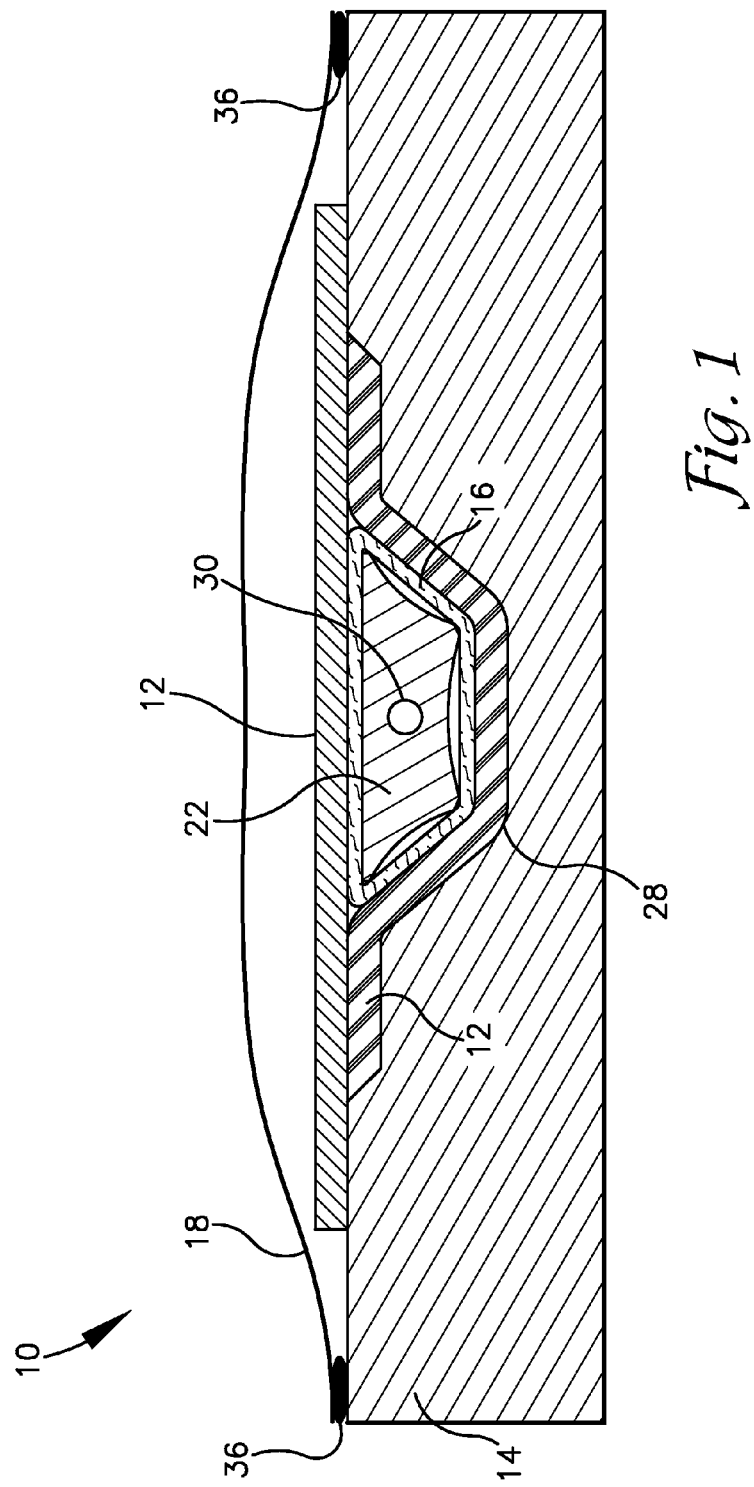
FIG. 1 is a schematic vertical cross-sectional elevation view of a composite manufacturing system constructed in accordance with various embodiments of the present invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

A composite manufacturing system 10, constructed in accordance with embodiments of the present invention, is shown in FIGS. 1-3. Embodiments of the invention are configured for maintaining a desired formation of uncured composite material 12 during cure thereof into a hollow, cured composite part, such as an aircraft stringer in a fuselage or other substantially hollow composite parts. The composite manufacturing system 10 may comprise a rigid forming tool 14, an internal bladder 16, an impermeable membrane 18, and a rescue bladder 20. Some embodiments of the invention may include multiple internal bladders 16 and multiple rescue bladders 20, depending on the requirements of the composite part being formed. Furthermore, the composite manufacturing system 10 may comprise an internal bladder stiffener 22, a rescue bladder stiffener 24, and/or end fittings 26.

The composite material 12, as is known in the art of aerospace manufacturing, may include a reinforcement material and a matrix material. Examples of the composite material 12 that may be used with the present invention include, but are not limited to, fiber materials such as carbon fiber, boron fiber, fiberglass, aramid fiber, ceramic fiber, and the like. In some embodiments of the invention, the composite material 12 may be fiber-based reinforcement materials existing in one of the following forms—either preimpregnated (prepreg) in which the fiber may be coated with a matrix material that is uncured, such as uncured resin, or unenhanced (dry) with no additives to the fiber. The matrix material may include resins, polymers, epoxies, and the like, among others. The composite material 12 may specifically comprise one or more plies of any uncured composite material and may comprise an outer surface placed against the rigid forming tool 14, an inner surface opposite of the outer surface, and opposing end edges. In some embodiments of the invention, at least portions of the composite material 12 may include skin laminate, as known in the art of aerospace manufacturing.

The rigid forming tool 14, as illustrated in FIGS. 1 and 3, may be any rigid forming tool known in the art for forming composite parts and may be made of FeNi36 (i.e., INVAR), graphite, steel, sufficiently rigid aluminum, and the like. The rigid forming tool 14 may have any shape or configuration desired for forming the composite material 12 into the hollow, cured composite part having desired dimensions and curvatures. For example, the rigid forming tool 14 may be made of substantially thick, non-malleable titanium, steel, aluminum, or any other material configured to remain rigid during composite material cure under autoclave heat and pressure. For forming stringers, the rigid forming tool may be curved according to a curvature of a panel for a fuselage or other aircraft component with a plurality of stringer channels 28 formed therein. The stringer channels 28 may have three walls, including an inner-most wall and two opposing side walls angled outward to form a typical hat-shaped stringer.

The internal bladder 16, as illustrated in FIGS. 1 and 3, may be a hollow, elongated component made of any substantially impermeable, flexible, and/or expandable material. For example, the internal bladder 16 may be made of rubber or other elastomeric materials. In some embodiments of the invention, the internal bladder 16 may form an elongated hollow tube having any cross-sectional shape, such as a trapezoid or hat shape traditionally used for composite stringers in aircraft nacelles. The internal bladder 16 may comprise an outer surface configured to rest against the composite material 12, an inner surface opposite the outer surface thereof, and at least one vent opening. For example, the internal bladder 16 may have vent openings at opposing ends thereof.

The impermeable membrane 18 may be any flexible impermeable sheet or vacuum bagging material known in the art of composite manufacturing. Specifically, the impermeable membrane 18 may be configured to compress and consolidate the composite material 12 during autoclave cure when sealed to the rigid forming tool 14. The impermeable membrane 18 may have an outer surface facing away from the rigid forming tool 14, an inner surface that is opposite of the outer surface and faces toward the rigid forming tool 14, and a plurality of peripheral edges.

The rescue bladder 20, as illustrated in FIGS. 2 and 3, may be made of polymethylpentene (PMP) or other similar materials. For example, the PMP material of the rescue bladder 20 may have sufficient longitudinal stiffness and latitudinal flexibility to be installed in long (e.g., 42 feet or more) curved internal bladders and may be capable of withstanding temperatures of at least 355 degrees F. The rescue bladder 20 may also be made of a material that allows adhesive tape to adhere thereto for integration into the impermeable membrane 18 of the composite manufacturing system 10.

The rescue bladder 20 may be sized and shaped to fit inside of the internal bladder 16. That is, the rescue bladder 20 may have a similar or identical shape to the internal bladder 16, but may be sized slightly smaller so as to fit within the inner surface of the internal bladder 16. The rescue bladder 20 may likewise have an outer surface facing the internal bladder, an opposing inner surface, and at least one vent opening. For example, the rescue bladder 20 may have vent openings at opposite ends thereof. The rescue bladder may be made of polymethylpentene (PMP) or other bladder materials having similar physical properties. Walls of the rescue bladder 20 may be thinner than walls of the internal bladder 16.

The internal bladder stiffener 22, as illustrated in FIG. 1, may be located or configured to be located within the internal bladder 16 and provides additional stiffening during cure. For example, the internal bladder stiffener 22 may be made of a material that experiences a small amount of thermal expansion during the cure cycle of the composite material 12, such that additional support/pressure is provided to the internal bladder 16 and therefore to the composite material 12 being cured, typically in corner or radii regions of the composite part being formed. The internal bladder stiffener 22 may be solid throughout and/or may have a hole 30 formed therethrough, extending from one end to another end, length-wise down the internal bladder stiffener 22. In some embodiments of the invention, the internal bladder stiffener 22 may have a similar cross-sectional shape to the internal bladder 16, such as a trapezoid or hat shape with an inner-most wall, two angled sidewalls, and an outer-most wall. However, in some embodiments of the invention, the inner-most wall and/or the two angled sidewalls of the internal bladder stiffener 22 may have concave surfaces.

The rescue bladder stiffener 24, as illustrated in FIG. 2, may be located or configured to be located within the rescue bladder 20, once it is inserted into the internal bladder 16, to provide additional stiffening during cure. For example, the rescue bladder stiffener 24 may be made of a material that experiences a small amount of thermal expansion during the cure cycle of the composite material 12, such that additional support/pressure is provided to the rescue bladder 20, the internal bladder 16, and/or the composite material 12 being cured, typically in corner or radii regions of the composite part being formed. The rescue bladder stiffener 24 may be solid throughout and/or may have a hole 32 formed therethrough, extending from one end to another end, length-wise down the rescue bladder stiffener 24. In some embodiments of the invention, the rescue bladder stiffener 24 may have a similar cross-sectional shape to the rescue bladder 20, such as a trapezoid or hat shape with an inner-most wall, two angled sidewalls, and an outer-most wall. However, in some embodiments of the invention, the inner-most wall and/or the two angled sidewalls of the rescue bladder stiffener 24 may have concave surfaces.

The end fittings 26, as illustrated in FIG. 2, may comprise internal bladder end fittings and/or rescue bladder end fittings made of aluminum or other metals. The end fittings 26 may be sized and shaped to be at least partially inserted into vent openings at ends of the internal bladder 16 and/or the rescue bladder 20. The end fittings 26 may be hollow, tube-like terminating features, each with at least one opening resting within the internal bladder 16 and/or the rescue bladder 20 and at least one opening resting outward of the internal bladder 16 and/or the rescue bladder 20. For example, as illustrated in FIG. 2, one of the end fittings 26 may be a short tube having a first opening and an opposing second opening. The first opening may be configured for mating onto one of the stiffeners 22,24, and the short tube may slightly taper toward the second opening. Another one of the end fittings 26, as illustrated in FIG. 2, may have an open end, an opposing closed end with a slanted or tapered wall, and a vent hole and/or vent tube 34 located between the open end and the opposing closed end. These configurations of the end fittings 26 may be used to assist in controlling an amount of pressure differential and thus an amount of inflation experienced by the internal bladder 16 and/or the rescue bladder 20. Additionally or alternatively, the end fittings 26 may be integrally formed with the internal bladder 16 and may be cut off before insertion of the rescue bladder 20, as described below. Although two end fittings 26 are illustrated in FIG. 2 as mating with the rescue bladder 20, note that in some embodiments of the invention, these end fittings 26 may be internal bladder end fittings that only mate with opposing ends of the internal bladder 16 and not the rescue bladder 20. Furthermore, in some embodiments of the invention a rescue bladder end fitting may be located at one end of the rescue bladder 20, but not on the other opposing end of the rescue bladder 20. For example, the rescue bladder end fitting may be positioned on an end of the rescue bladder 20 slid into the internal bladder 16.

Some embodiments of the invention may further require the use of adhesive tape 36 to seal the impermeable membrane 18 to the rigid forming tool 14, as later described herein. The adhesive tape 36 may be any adhesive tape known in the art and configured for creating a substantially air-tight seal between the rigid forming tool 14 and the impermeable membrane 18. In other embodiments of the invention, the adhesive tape 36 may be replaced with other types of sealing devices configured for sealing the impermeable membrane 18 to the rigid forming tool 14 without departing from the scope of the invention.

Furthermore, some embodiments of the invention may require a release film, breather, flow media, or other traditional composite cure tooling elements without departing from the scope of the invention. For example, a breather cloth and/or flow media may be used for allowing resin to flow through the uncured composite material 12, and release film may be used for preventing the impermeable membrane 18 from adhering to the composite material 12 during cure.

In use, a method of bladder repair during composite cure using the rescue bladder 20 described above may include the steps of forming the composite material 12 around the internal bladder 16 in a traditional manner, determining that a leak exists in the internal bladder 16, then placing the rescue bladder 20 into the internal bladder 16, typically in place of the internal bladder stiffener 24. The rescue bladder 20 may also have the rescue bladder stiffener 24 inserted therein, and opposing ends of the rescue bladder 20 may be sealed to the rigid forming tool 14 and/or the impermeable membrane 18, leaving at least one vent opening open to ambient air in the autoclave. Then the rescue bladder 20 may expand during cure and thus seal any leaks in the internal bladder 16.

Method steps for bladder repair during composite cure using the rescue bladder 20 will now be described in more detail. Specifically, FIG. 4 illustrates steps in a method 400 for bladder repair during composite cure in accordance with various embodiments of the present invention. The steps of the method 400 may be performed in the order as shown in FIG. 4, or they may be performed in a different order. Furthermore, some steps may be performed concurrently as opposed to sequentially. In addition, some steps may not be performed.

The method 400 may include a step of placing the uncured composite material 12 onto the rigid forming tool 14, as depicted in block 402. For example, one or more sheets of the uncured composite material may be placed into the stringer channels 28 of the rigid forming tool 14. Additionally or alternatively, step 402 may include wrapping the composite material 12 around the internal bladder 16 and then placing the composite material 12 and the internal bladder 16 into the stringer channels 28. Additionally or alternatively, the method 400 may include the steps of placing the internal bladder 16 onto the composite material 12, as depicted in block 404, and placing another layer of composite material 12 and/or skin laminate over the internal bladder 16, as depicted in block 406. Specifically, the internal bladder 16 may be placed onto the composite material 12 located in the stringer channel 28, and one or more sheets of composite material or skin laminate may be placed over the internal bladder 16, extending over multiple ones of the stringer channels 28 and their corresponding internal bladders 16. Note that the internal bladder stiffener 22 and/or the end fittings 26 may be secured within and/or to the internal bladder 16 either before or after any of steps 402-406.

Next, the method 400 may include the steps of placing the impermeable membrane 18 over the composite material 12 or skin laminate, as depicted in block 408, and sealing the impermeable membrane 18 to the rigid forming tool 14, the outer surface of the internal bladder 16, and/or end fittings 26 attached to the internal bladder 16, as depicted in block 410. The impermeable membrane 18 may be sealed to the rigid forming tool 14 and the internal bladder 16 using the adhesive tape 36 or any other method known in the art. However, the impermeable membrane 18 may be sealed in such a manner that it does not cover one or more of the vent openings of the internal bladder 16. In some embodiments of the invention, the impermeable membrane 18 is sealed to an outer surface of the end fittings 26 mating with ends of the internal bladder 16, while still leaving the openings, vent holes, and/or vent tubes 34 uncovered by the impermeable membrane 18. In general, all or a majority of the outer surface of the internal bladder 16 is sealed off from ambient air and the inner surface of the internal bladder 16 is exposed to ambient air following step 410. This configuration allows for expansion/inflation of the internal bladder 16 when a pressure differential is introduced via vacuum compression of the impermeable membrane 18 and/or autoclave cure pressure.

The method 400 may also include a step of determining a leak exists in the internal bladder 16, as depicted in block 412. For example, curing may begin, but if a leak is suspected in one of the internal bladders 16 prior to cure temperatures reaching 190° F. or other known or selected critical cure stage temperatures, the operator may abort the cure cycle and open the door. The operator may then investigate the internal bladder 16 to ensure that bond lines between the end fittings 26 and the internal bladder 16 are sufficiently intact/sealed. For example, soapy water and positive pressure may be used in the internal bladder 16 as an indicator of a leak at that location. If there is no identified leak at this bond line, the method may then include the steps of removing at least one of the end fittings 26, as depicted in block 414, and removing the internal bladder stiffener 22, as depicted in block 416. In some embodiments of the invention, this may require detachment of the impermeable membrane 18 and/or replacement of the impermeable membrane 18 if it is damaged during detachment from the end fittings 26. Furthermore, as noted above, in embodiments where the end fittings 26 are integrally formed with the internal bladder 16, the end fittings may be cut off before insertion of the rescue bladder 20, providing an opening through which the rescue bladder may fit through.

Next, the method 400 may include a step of inserting the rescue bladder 20 into the internal bladder 16, as depicted in block 418. The method 400 may further include inserting the rescue bladder stiffener 24 into the rescue bladder 20 either before or after step 418, as depicted in block 420, and reattaching or mating the removed end fittings 26 to the internal bladder 16 and/or the rescue bladder 20, as depicted in block 422. In some embodiments of the invention, the stiffeners 22,24 may be omitted or may reference a single stiffener configured to be alternatively used inside both the internal bladder 16 and the rescue bladder 20.

The method 400 may then include a step of sealing the impermeable membrane 18 to the outer surface of the rescue bladder 20 and/or end fittings 26 attached to the internal bladder 16 and/or the rescue bladder 20, as depicted in block 424. This step may also include sealing the outer surface of the rescue bladder 20 and/or end fittings 26 to the rigid forming tool 14, if required to form an air-tight chamber around the composite material 12 using the rescue bladder 20. The composite material 12 is thus sealed within a chamber formed by the impermeable membrane 18, the rigid forming tool 14, and the rescue bladder 20 via the adhesive tape 36 or any other sealing method known in the art. Again, the openings, vent holes, and/or vent tubes 34 of the end fittings 26 may remain uncovered by the impermeable membrane 18.

Finally, the method 400 may include a step of resuming cure of the composite material 12 under autoclave, as depicted in block 426. In this configuration, the rescue bladder 20 will seal off any leaks in the internal bladder 16, such that it may compress the composite material 12 under autoclave pressure against the rigid forming tool 14. Note that other methods of introducing a pressure differential to inflate the rescue bladder 20 and/or the internal bladder 16 may be used without departing from the scope of the invention.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of sealing a leak in an internal bladder within a hollow uncured composite part during cure, the method comprising:
   detecting a leak in the internal bladder after the cure has begun;
   placing a rescue bladder within the internal bladder after the leak is detected, wherein the rescue bladder is hollow with at least one vent opening, an outer surface, and an inner surface;
   sealing one of the outer surface of the rescue bladder and an end fitting fluidly coupled with the at least one vent opening of the rescue bladder to at least one of an impermeable membrane and a rigid forming tool, thereby sealing the uncured composite part within a chamber cooperatively formed by the at least one of the impermeable membrane and the rigid forming tool and the and the one of the outer surface of the rescue bladder and the end fitting, wherein at least one of the vent opening of the rescue bladder and a vent hole or tube of the end fitting are outward of the chamber; and
   curing the hollow uncured composite part under heat and pressure, wherein a pressure differential between atmosphere within the chamber and atmosphere outward of the chamber causes the rescue bladder to inflate and press the internal bladder against an inner surface of the hollow uncured composite part during curing.

2. The method of claim 1, further comprising a step of:
   removing the end fitting from a vent opening of the internal bladder prior to placing the rescue bladder within the internal bladder.

3. The method of claim 2, further comprising a step of:
   reattaching or mating the end fitting at the vent opening of at least one of the internal bladder and the rescue bladder after the step of placing the rescue bladder within the internal bladder.

4. The method of claim 1, wherein a stiffener is located within the rescue bladder.

5. The method of claim 1, wherein the rescue bladder is made of polymethylpentene (PMP).

6. The method of claim 3, wherein the end fitting includes a hollow metal tube having a first opening and a second opening opposite the first opening, wherein the hollow metal tube tapers toward the second opening.

7. The method of claim 3, wherein the end fitting includes a hollow metal tube having an open end, an opposing closed end with a slanted or tapered wall, and at least one of the vent hole and the vent tube located between the open end and the opposing closed end.

8. The method of claim 1, further comprising the steps of:
detecting the leak in the internal bladder prior to cure temperatures reaching a critical cure stage temperature; and
stopping curing of the uncured composite part prior to temperatures reaching the critical cure stage temperature and prior to placing the rescue bladder within the internal bladder.

9. A method of sealing a leak in a hollow internal bladder located within a hollow uncured composite part during cure, wherein the hollow uncured composite part includes composite material wrapped around at least a portion of the internal bladder, the method comprising:
detecting a leak in the internal bladder after a curing cycle begins but prior to cure temperatures reaching a critical cure stage temperature;
stopping curing of the uncured composite part after the curing cycle begins but prior to temperatures reaching the critical cure stage temperature;
removing an end fitting from a vent opening of the internal bladder;
placing a rescue bladder within the internal bladder after the leak is detected, wherein the rescue bladder is hollow with two opposing vent openings, an outer surface, and an inner surface;
sealing one of the outer surface of the rescue bladder and the end fitting to at least one of an impermeable membrane and a rigid forming tool, thereby sealing the uncured composite part within a chamber cooperatively formed by the at least one of the impermeable membrane and the rigid forming tool and the and the one of the outer surface of the rescue bladder and the end fitting, wherein at least one of the vent opening of the rescue bladder and a vent opening of the end fitting are outward of the chamber; and
curing the hollow uncured composite part under heat and pressure, wherein a pressure differential between atmosphere within the chamber and atmosphere outward of the chamber causes the rescue bladder to inflate and press the internal bladder against an inner surface of the hollow uncured composite part during curing.

10. The method of claim 9, further comprising the steps of removing an internal bladder stiffener from within the internal bladder prior to placing the rescue bladder within the internal bladder.

11. The method of claim 9, wherein the end fitting is a hollow metal tube having a first opening and a second opening opposite the first opening, wherein the hollow metal tube tapers toward the second opening.

12. The method of claim 9, wherein the end fitting is a hollow metal tube having an open end, an opposing closed end with a slanted or tapered wall, and at least one of a vent hole and vent tube located between the open end and the opposing closed end.

13. The method of claim 9, wherein the rescue bladder is made of polymethylpentene (PMP).

14. The method of claim 9, wherein a rescue bladder stiffener is located within the rescue bladder placed within the internal bladder.

15. A method of sealing a leak in a hollow internal bladder located within a hollow uncured composite part during cure, wherein the hollow uncured composite part is an aircraft stringer and includes composite material wrapped around at least a portion of the internal bladder and placed in a stringer cavity of a rigid forming tool, the method comprising:
detecting a leak in the internal bladder prior to cure temperatures reaching a critical cure stage temperature;
stopping curing of the uncured composite part prior to temperatures reaching the critical cure stage temperature;
placing a rescue bladder within the internal bladder after the leak is detected, wherein the rescue bladder is hollow with two opposing vent openings, an outer surface, and an inner surface, wherein a rescue bladder stiffener is located within the rescue bladder;
sealing one of the outer surface of the rescue bladder and an end fitting fluidly coupled with at least one of the vent openings of the rescue bladder to at least one of an impermeable membrane and the rigid forming tool, thereby sealing the uncured composite part within a chamber cooperatively formed by the at least one of the impermeable membrane and the rigid forming tool and the one of the outer surface of the rescue bladder and the end fitting, wherein at least one of the vent opening of the rescue bladder and a vent opening of the end fitting are outward of the chamber; and
curing the hollow uncured composite part sealed within the chamber under autoclave heat and pressure, wherein a pressure differential between atmosphere within the chamber and atmosphere outward of the chamber causes the rescue bladder to inflate and press the internal bladder against an inner surface of the hollow uncured composite part during curing.

16. The method of claim 15, further comprising a step of:
removing or cutting off the end fitting from a vent opening of the internal bladder prior to placing the rescue bladder within the internal bladder.

17. The method of claim 16, further comprising a step of:
reattaching or mating the end fitting at the vent opening of at least one of the internal bladder and the rescue bladder after the step of placing the rescue bladder within the internal bladder.

18. The method of claim 17, wherein the end fitting is a hollow metal tube having a first opening and a second opening opposite the first opening, wherein the hollow metal tube tapers toward the second opening.

19. The method of claim 17, wherein the end fitting is a hollow metal tube having an open end, an opposing closed end with a slanted or tapered wall, and at least one of a vent hole and vent tube located between the open end and the opposing closed end.

20. The method of claim 15, wherein the rescue bladder is made of polymethylpentene (PMP).

* * * * *